(12) United States Patent
Ogura et al.

(10) Patent No.: US 10,707,455 B2
(45) Date of Patent: Jul. 7, 2020

(54) BATTERY PACK

(71) Applicants: MAKITA CORPORATION, Anjo-shi, Aichi (JP); MURATA MANUFACTURING CO., LTD., Nagaokakyo-shi, Kyoto (JP)

(72) Inventors: Hironori Ogura, Anjo (JP); Akira Naito, Anjo (JP); Akinori Terui, Koriyama (JP)

(73) Assignees: MAKITA CORPORATION, Anjo (JP); TOHOKU MURATA MANUFACTURING CO., LTD., Kyoto (JP)

( * ) Notice: Subject to any disclaimer, the term of this patent is extended or adjusted under 35 U.S.C. 154(b) by 147 days.

(21) Appl. No.: 15/566,429

(22) PCT Filed: Jan. 4, 2016

(86) PCT No.: PCT/JP2016/050036
§ 371 (c)(1),
(2) Date: Oct. 13, 2017

(87) PCT Pub. No.: WO2016/170799
PCT Pub. Date: Oct. 27, 2016

(65) Prior Publication Data
US 2018/0130980 A1 May 10, 2018

(30) Foreign Application Priority Data
Apr. 24, 2015 (JP) ................................. 2015-088948

(51) Int. Cl.
B25F 5/02 (2006.01)
H01M 2/02 (2006.01)
(Continued)

(52) U.S. Cl.
CPC ............. *H01M 2/1016* (2013.01); *B25F 5/02* (2013.01); *B25F 5/021* (2013.01); *H01M 2/02* (2013.01);
(Continued)

(58) Field of Classification Search
None
See application file for complete search history.

(56) References Cited

U.S. PATENT DOCUMENTS

| 5,517,277 A | 5/1996 | Goto et al. |
| 2012/0104991 A1 | 5/2012 | Suzuki et al. |

(Continued)

FOREIGN PATENT DOCUMENTS

| CN | 202076342 U | 12/2011 |
| CN | 104103799 A | 10/2014 |

(Continued)

OTHER PUBLICATIONS

Mar. 8, 2016 Search Report issued in International Patent Application No. PCT/JP2016/050036.
(Continued)

*Primary Examiner* — Haroon S. Sheikh
(74) *Attorney, Agent, or Firm* — Oliff PLC

(57) ABSTRACT

A battery pack disclosed in the present description includes an outer case including a display portion and an opening portion, wherein the display portion includes one or more display windows; a battery cell housed in the outer case; a substrate housed in the outer case, wherein one or more light emitting elements corresponding to the one or more display windows are mounted on the substrate; and a light shielding wall housed in the outer case, wherein the light shielding wall is arranged to block the opening portion and the one or more light emitting elements from each other.

19 Claims, 11 Drawing Sheets

(51) Int. Cl.
  *H01M 2/10*   (2006.01)
  *H01M 10/48*  (2006.01)
  *H01M 10/46*   (2006.01)

(52) U.S. Cl.
  CPC ....... *H01M 10/482* (2013.01); *H01M 10/488* (2013.01); *H01M 2/1077* (2013.01); *H01M 10/46* (2013.01)

(56) References Cited

U.S. PATENT DOCUMENTS

| | | |
|---|---|---|
| 2012/0162840 A1 | 6/2012 | Noda |
| 2014/0302353 A1 | 10/2014 | Ogura |
| 2015/0054464 A1 | 2/2015 | Suzuki et al. |

FOREIGN PATENT DOCUMENTS

| | | |
|---|---|---|
| JP | H06-029011 A | 2/1994 |
| JP | H07-191372 A | 7/1995 |
| JP | 2008-034263 A | 2/2008 |
| JP | 2008-091234 A | 4/2008 |
| JP | 2009-130260 A | 6/2009 |
| JP | 2012-091293 A | 5/2012 |
| JP | 2012-135849 A | 7/2012 |
| JP | 2014-203702 A | 10/2014 |

OTHER PUBLICATIONS

Feb. 12, 2019 Office Action issued in Japanese Patent Application No. 2015-088948.
Oct. 24, 2017 International Preliminary Report on Patentability issued in International Patent Application No. PCT/JP2016/050036.
Sep. 30, 2019 Office Action issued in Chinese Patent Application No. 201680023211.4.

BATTERY PACK

TECHNICAL FIELD

A technique disclosed in the present description relates to a battery pack.

BACKGROUND ART

Patent Literature 1 describes a battery pack. This battery pack includes an outer case including a display portion provided with a plurality of display windows and an opening portion, a battery cell housed in the outer case, and a substrate housed in the outer case and on which a plurality of light emitting elements corresponding to the plurality of display windows is mounted.

CITATION LIST

Patent Literature 1: Japanese Patent Application Publication No. 2014-203702

SUMMARY OF INVENTION

Technical Problem

In such a battery pack described above, when at least one of light emitting elements is caused to emit light to light up its corresponding display window among the plurality of display windows, the light from the light emitting element may leak to outside through an opening portion of an outer case. The present description provides a technique capable of preventing light from a light emitting element from leaking to outside through an opening portion of an outer case.

Solution to Technical Problem

The present description discloses a battery pack. The battery pack may comprise an outer case including a display portion and an opening portion, wherein the display portion may include one or more display windows; a battery cell housed in the outer case; a substrate housed in the outer case, wherein one or more light emitting elements corresponding to the one or more display windows are mounted on the substrate; and a light shielding wall housed in the outer case, wherein the light shielding wall is arranged to block the opening portion and the one or more light emitting elements from each other.

According to the aforementioned battery pack, the one or more light emitting elements and the opening portion are blocked from each other by the light shielding wall. Thus, when at least one of the one or more light emitting elements is caused to emit light to light up its corresponding display window, the light from the light emitting element can be prevented from leaking to outside through the opening portion of the outer case.

DESCRIPTION OF EMBODIMENTS

Figure 1:
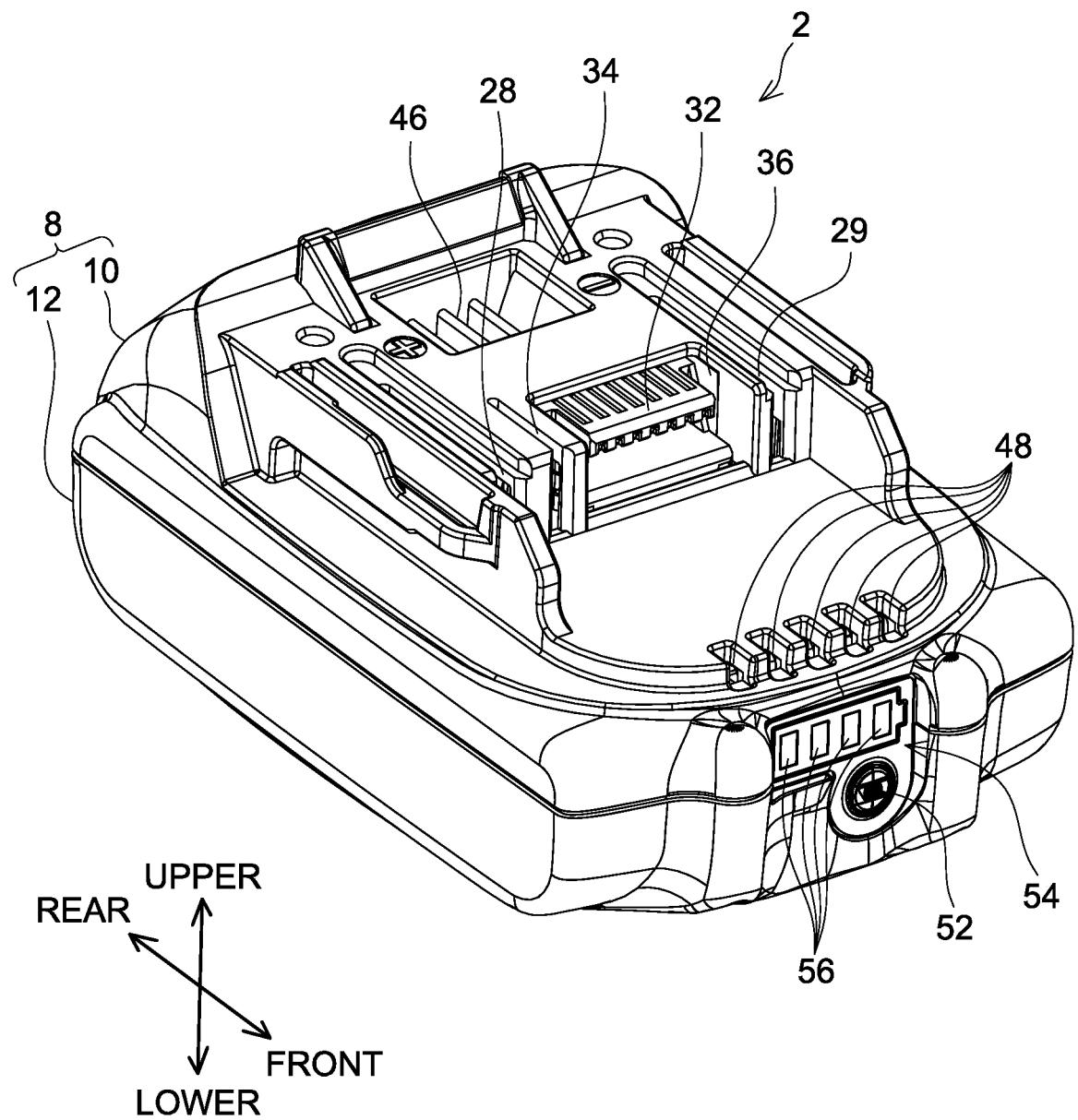
FIG. 1 is an upper-front perspective view of a battery pack 2 according to an embodiment.

In a battery pack according to some embodiments, the battery pack may further comprise a light guiding member housed in the outer case. The light guiding member may include one or more light transmitting members and a light shielding member, wherein the one or more light transmitting members may correspond to the one or more light emitting elements and the one or more display windows. Each of the one or more light transmitting members may include a light receiving surface and a light projecting surface, wherein the light receiving surface may receive light emitted from one of the one or more light emitting elements, and the light projecting surface may project the light received on the light receiving surface onto one of the one or more display windows. A part of the light shielding member may constitute the light shielding wall.

If light emitted from one of one or more light emitting elements is directly projected onto its corresponding one of one or more display windows, the display window is lighted up such that brightness is high at its center and becomes gradually lower toward its periphery. Contrary to this, as in the aforementioned battery pack, if light emitted from one of the one or more light emitting elements is projected onto its corresponding one of the one or more display windows through its corresponding one of the light transmitting members, the display window is lighted up such that brightness is uniform over its entirety. According to the aforementioned battery pack, visibility of the display portion can be further improved.

In a battery pack according to some embodiments, the light shielding member integrally be formed with the one or more light transmitting members.

According to the aforementioned battery pack, a number of components can be reduced and assembling workability can be improved.

In a battery pack according to some embodiments, the light shielding member may include a partition wall arranged to block the light transmitting members, which are adjacent to each other, from each other.

According to the aforementioned battery pack, light received by a certain light transmitting member from its corresponding light emitting element can be prevented from leaking out to another light transmitting member adjacent thereto.

In a battery pack according to some embodiments, the light shielding member further includes an extended wall extending from the partition wall, and the extended wall is arranged to block the light emitting elements, which are adjacent to each other, from each other.

According to the aforementioned battery pack, light emitted from a certain light emitting element can be prevented from being received by a light transmitting member which is different from a light transmitting member corresponding to the light emitting element.

In a battery pack according to some embodiments, the one or more light emitting elements are mounted on a second surface of the substrate, wherein the second surface is on an opposite side to a first surface of the substrate facing the opening portion. The light shielding wall contacts the first surface of the substrate and the extended wall contacts the second surface of the substrate so that the light guiding member engages an end portion of the substrate.

According to the aforementioned battery pack, misalignment of the light guiding member relative to the substrate can be prevented.

In a battery pack according to some embodiments, the battery pack may further comprise a cell case housed in the outer case, wherein the cell case supports the battery cell, the substrate and the light guiding member. The light shielding member may be provided with a rib. The cell case may be provided with a guide groove corresponding to the rib. The rib may be housed into the guide groove, when the light guiding member is attached to the cell case.

According to the aforementioned battery pack, the light guiding member can be accurately positioned relative to the cell case, and misalignment between the light guiding member and the cell case can be prevented.

In a battery pack according to some embodiments, the projecting surface may be tilted with respect to the receiving surface, in each of the one or more light transmitting member.

According to the aforementioned battery pack, even if a display window is tilted with respect to a straight line passing through a center of the display window and a center of its corresponding light emitting element, the display window can be lighted up with a uniform brightness. Visibility of the display portion can be further improved.

In a battery pack according to some embodiments, the opening portion may be provided in a surface of the outer case facing a charger when the battery pack is attached to the charger.

In some chargers, when a battery pack is charged with the battery pack attached to a charger, the charger delivers air to inside of the outer case of the battery pack to cool down the battery cell. According to the aforementioned battery pack, light of a light emitting element can be prevented from leaking out through the opening portion provided in the outer case for the air delivery upon charging the battery pack by using such a charger.

In a battery pack according to some embodiments, the opening portion may be provided at a position on the outer case visible from outside when the battery pack is attached to a charger, a power tool or an electronic device.

According to the aforementioned battery pack, light of a light emitting element can be prevented from leaking out through the opening portion provided at the position visible from outside when the battery pack is attached to a charger, a power tool, or an electronic device.

In a battery pack according to some embodiments, when seen in a plan view of the battery pack, the opening portion may be positioned between the one or more light emitting elements and the one or more display windows.

If an opening portion is positioned between light emitting elements and display windows when seen in a plan view of a battery pack, light from the light emitting elements is likely to leak through the opening portion. According to the aforementioned battery pack, even if the opening portion is positioned at such a position, light from a light emitting element can be prevented from leaking out through the opening portion.

Embodiment

Figure 2:
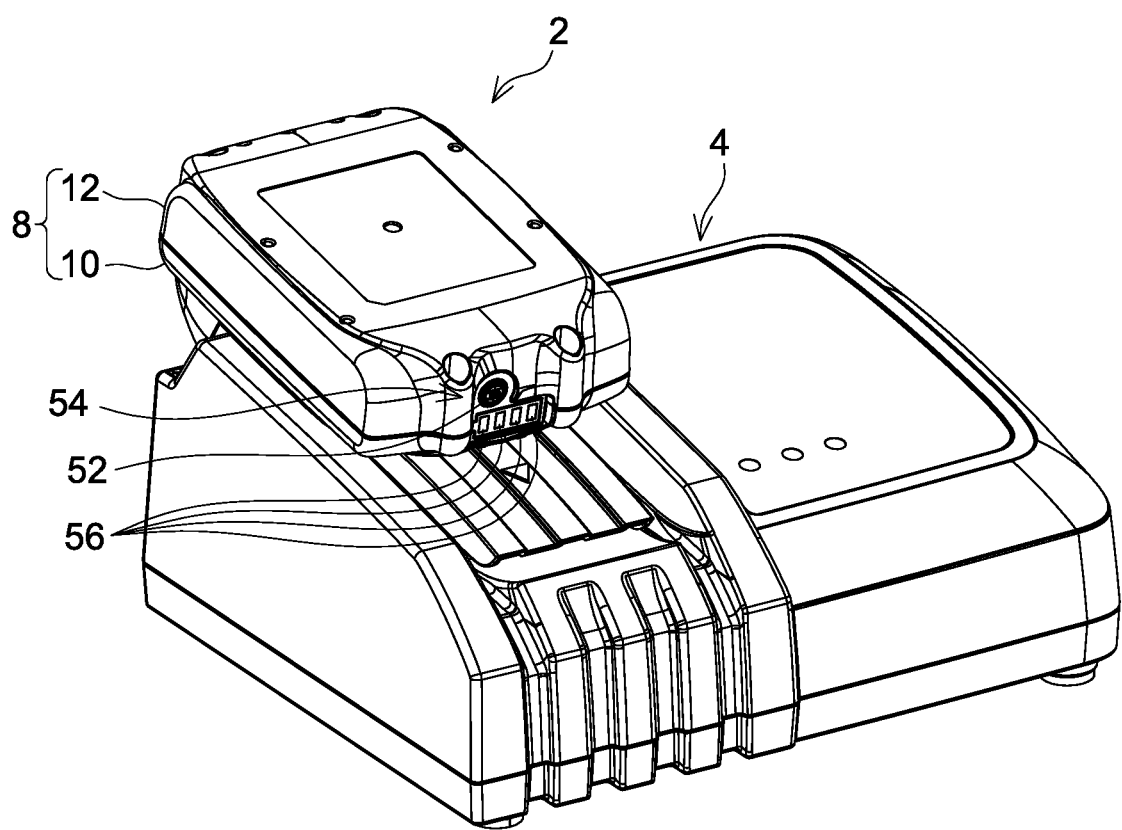
FIG. 2 is a perspective view showing a state where the battery pack 2 of the embodiment is attached to a charger 4.

A battery pack 2 of an embodiment will be described hereinbelow, with reference to the is drawings. The battery pack 2 shown in FIG. 1 can be detachably attached to a power tool (not shown) such as an electric drill, electric driver, electric grinder, electric circular saw, electric chain saw, electric reciprocating saw, electric lawn mower, electric grass trimmer, electric blower, or the like. The battery pack 2 supplies power to the power tool when attached to the power tool. Further, as shown in FIG. 2, the battery pack 2 can be detachably attached to a charger 4. It should be noted that, in FIG. 2, the battery pack 2 is shown upside down compared to the same shown in FIG. 1. The battery pack 2 is supplied with power from the charger 4 when attached to the charger 4. It should be noted that, hereinbelow, a direction in which the power tool or the charger 4 is located in a view of the battery pack 2 when the battery pack 2 is attached to the power tool or the charger 4 is termed "upper", and an opposite direction thereto is termed "lower". Further, a direction toward which the battery pack 2 is slid upon being attached to the power tool or the charger 4 is termed "front", and a direction toward which the battery pack 2 is slid upon being detached from the power tool or the charger 4 is termed "rear".

The battery pack 2 comprises a battery module 6 (see FIG. 3) and an outer case 8 housing the battery module 6. The outer case 8 has a substantially cuboid shape as a whole, and is divided into an upper case 10 and a lower case 12. The upper case 10 and the lower case 12 are fixed to each other by a fastener such as a bolt.

Figure 3:
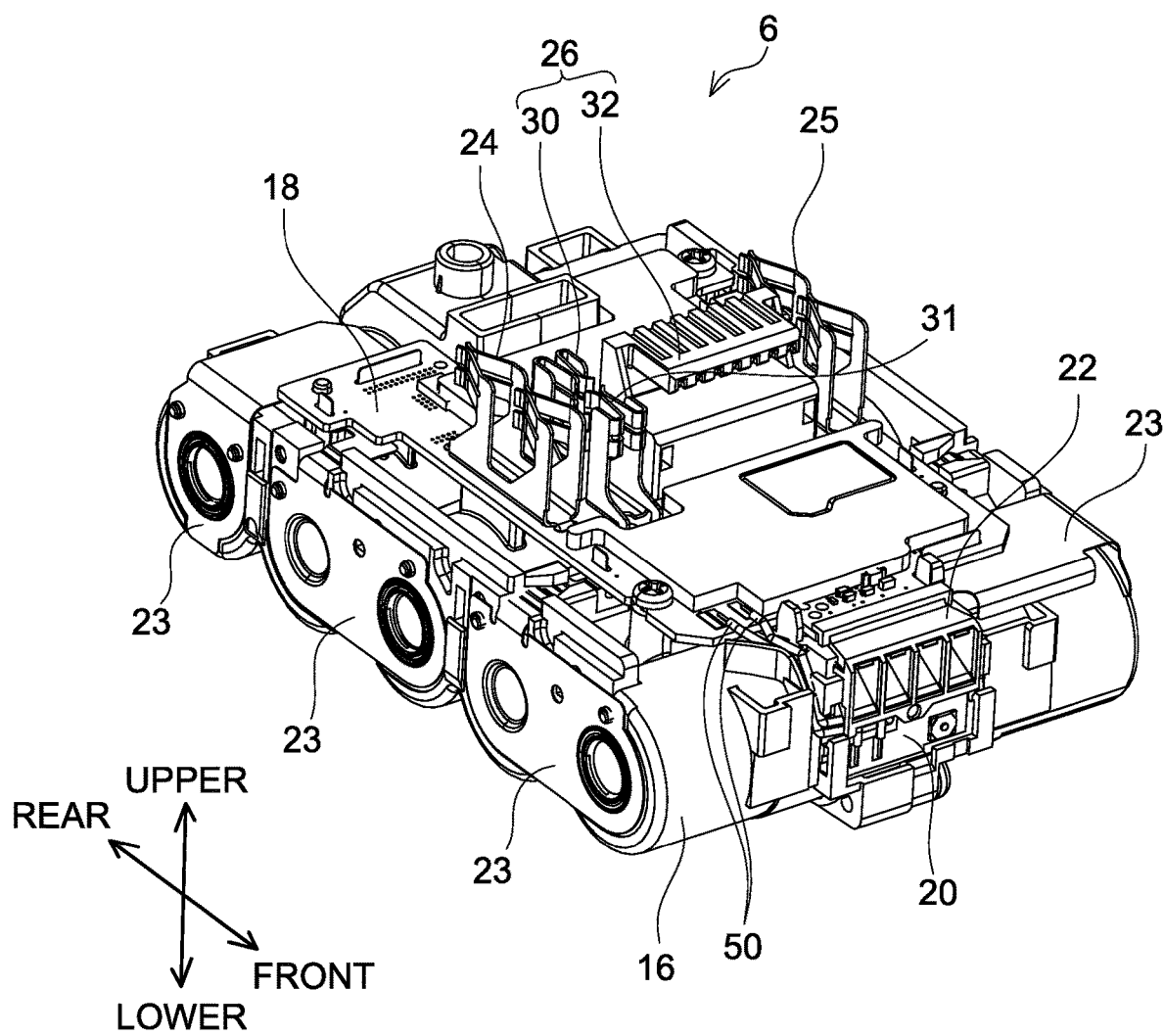
FIG. 3 is an upper-front perspective view of a battery module 6 of the embodiment.

As shown in FIG. 3, the battery module 6 comprises a cell case 16 housing a plurality of battery cells 14 (see FIG. 4), a control substrate 18, a button substrate 20, and a light guiding member 22. In the present embodiment, each of the battery cells 14 is a cylindrical secondary battery cell, for example, a lithium-ion battery cell, which is provided with a positive electrode on its one end and a negative electrode on the other end. The battery cells 14 are arranged in a front-and-rear direction such that a direction from the positive electrode to the negative electrode in each battery cell 14 is opposite to that of its adjacent battery cell 14. The positive electrode and the negative electrode of each battery cell 14 are exposed to outside of the cell case 16, and are connected to metal connection plates 23 provided on right and left sides of the cell case 16. The battery cells 14 are electrically connected in series by the connection plates 23.

The control substrate 18 is arranged above the cell case 16. The control substrate 18 is arranged along a plane perpendicular to an upper-and-lower direction. The control substrate 18 is fixed to the cell case 16 via a fastener such as a bolt. A discharge positive terminal 24, a charge-discharge negative terminal 25, a charge positive terminal 31, and a charge-discharge signal terminal 26 are provided on an upper surface of the control substrate 18. The charge-discharge signal terminal 26 comprises a discharge inhibiting signal terminal 30 and a charge controlling signal terminal 32. The discharge positive terminal 24 is used as a positive terminal for supplying power to the power tool from the battery pack 2 when the battery pack 2 is attached to the power tool. The charge-discharge negative terminal 25 is used as a negative terminal for supplying power to the power tool from the battery pack 2 when the battery pack 2 is attached to the power tool, and is also used as a negative terminal for supplying power to the battery pack 2 from the charger 4 when the battery pack 2 is attached to the charger 4. The charge positive terminal 31 is used as a positive terminal for supplying power to the battery pack 2 from the charger 4 when the battery pack 2 is attached to the charger 4. The discharge inhibiting signal terminal 30 is used to transmit a discharge inhibiting signal to the power tool from the battery pack 2 when the battery pack 2 is attached to the power tool. The charge controlling signal terminal 32 is used to transmit a charge controlling signal to the charger 4 from the battery pack 2 when the battery pack 2 is attached to the charger 4. The discharge positive terminal 24 is arranged in a charge-discharge first opening 28 provided in an upper surface of the upper case 10 shown in FIG. 1. The charge-discharge negative terminal 25 is arranged in a charge-discharge second opening 29 provided in the upper surface of the upper case 10. The charge positive terminal 31 and the discharge inhibiting signal terminal 30 are arranged in a charge-discharge third opening 34 provided in the upper surface of the upper case 10. The charge controlling signal terminal 32 is exposed to outside from a charge-discharge fourth opening 36 provided in the upper surface of the upper case 10. Upon attaching the battery pack 2 to the power tool, by sliding the battery pack 2 in the front-and-rear direction, three rectangular plate-like terminals (not shown) extending from the power tool are respectively inserted into the charge-discharge first opening 28, the charge-discharge second opening 29, and the charge-discharge third opening 34, and respectively engage with the discharge positive terminal 24, the charge-discharge negative terminal 25, and the discharge inhibiting signal terminal 30. Upon attaching the battery pack 2 to the charger 4, by sliding the battery pack 2 in the front-and-rear direction, two rectangular plate-like terminals (not shown) extending from the charger 4 are respectively inserted into the charge-discharge second opening 29 and the charge-discharge third opening 34, and respectively engage with the charge-discharge negative terminal 25 and the charge positive terminal 31, and a charge controlling signal terminal (not shown) of the charger 4 engages with the charge controlling signal terminal 32 of the battery pack 2.

Figure 4:
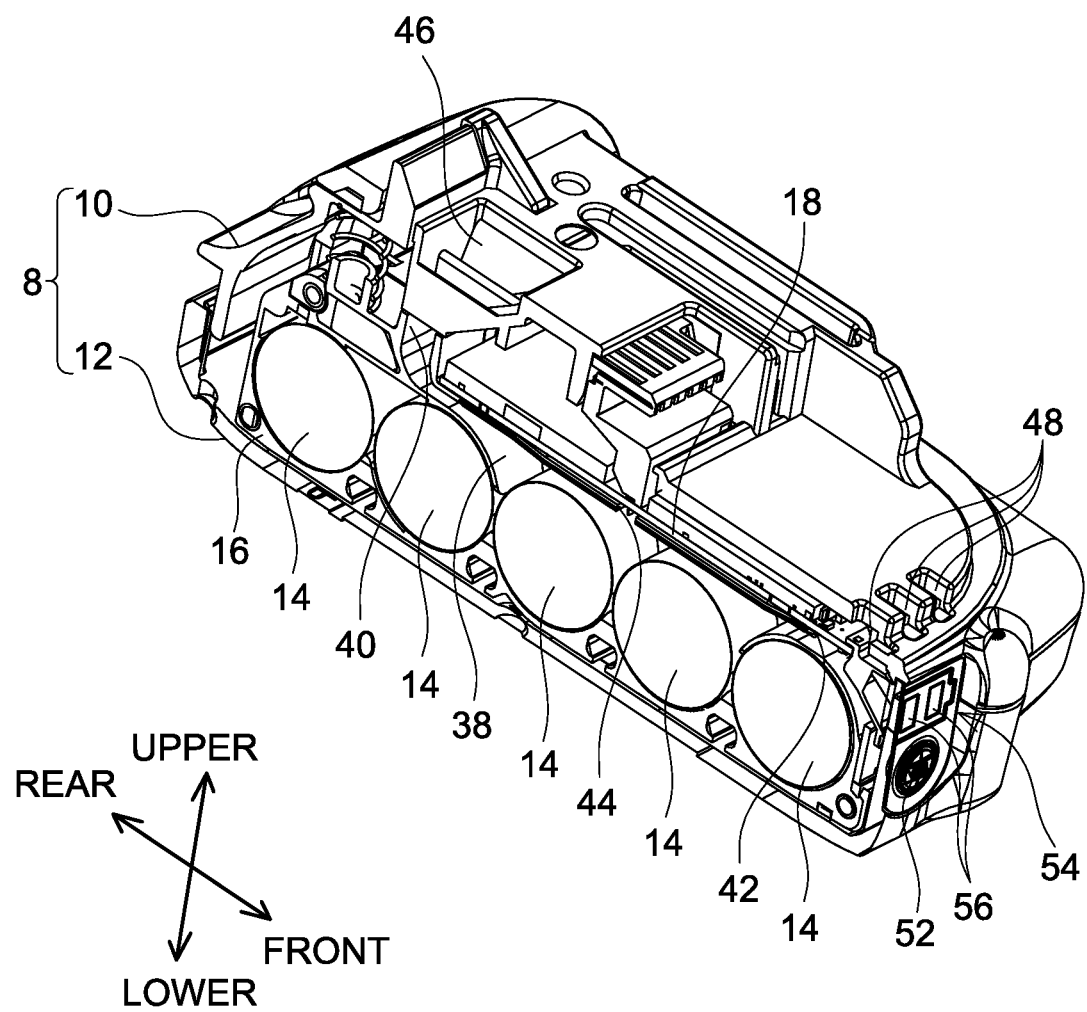
FIG. 4 is an upper-front cross-sectional perspective view of the battery pack 2 of the embodiment.

As shown in FIG. 4, an airflow path 38 is provided inside the cell case 16. The airflow path 38 communicates with an air supply port 40 provided in an upper-rear portion of the cell case 16, a front air exhaust port 42 provided in an upper-front portion of the cell case 16, and a middle air exhaust port 44 provided in an upper-middle portion of the cell case 16 in the front-and-rear direction. An air supply opening 46, which corresponds to the air supply port 40 of the cell case 16, is provided in the upper surface of the upper case 10 on a rear side. Air exhaust openings 48 are provided in the upper surface of the upper case 10 on a front side. In a state where the battery pack 2 is attached to the charger 4 as shown in FIG. 2, air is delivered into the air supply opening 46 of the upper case 10 by a fan (not shown) incorporated in the charger 4. The air delivered from the air supply opening 46 flows into the cell case 16 through the air supply port 40, and flows in the airflow path 38. The air flowing in the airflow path 38 cools the battery cells 14 housed in the cell case 16, and then flows to outside of the cell case 16 from the front air exhaust port 42 and the middle air exhaust port 44. The air which has flown to outside of the cell case 16 flows around the control substrate 18, and then flows to outside of the battery pack 2 through the air exhaust openings 48.

As shown in FIG. 3, in the battery module 6, the button substrate 20 and the light guiding member 22 are arranged on the front side of the cell case 16. The button substrate 20 is arranged along a plane perpendicular to the front-and-rear direction. The button substrate 20 is connected to the control substrate 18 via a lead wire 50. The light guiding member 22 is arranged on an upper side relative to the button substrate 20. As shown in FIG. 1, on the front side of the lower case 12, a push button 52 is arranged corresponding to the button substrate 20, and a display portion 54 is arranged corresponding to the light guiding member 22. The display portion 54 comprises a plurality of display windows 56. Each of the display windows 56 has a rectangular shape, and the display windows 56 are arranged to line along a right-and-left direction. Further, on a lower surface of the control substrate 18, a plurality of light emitting elements 58 (see FIG. 10) is arranged corresponding to the plurality of display windows 56. When the push button 52 is pushed, one or more of the light emitting elements 58 emit light in a pattern corresponding to a current amount of charged energy in the battery pack 2. The light emitted from each of the light emitting elements 58 is irradiated to corresponding one of the display windows 56 through the light guiding member 22.

Figure 5:
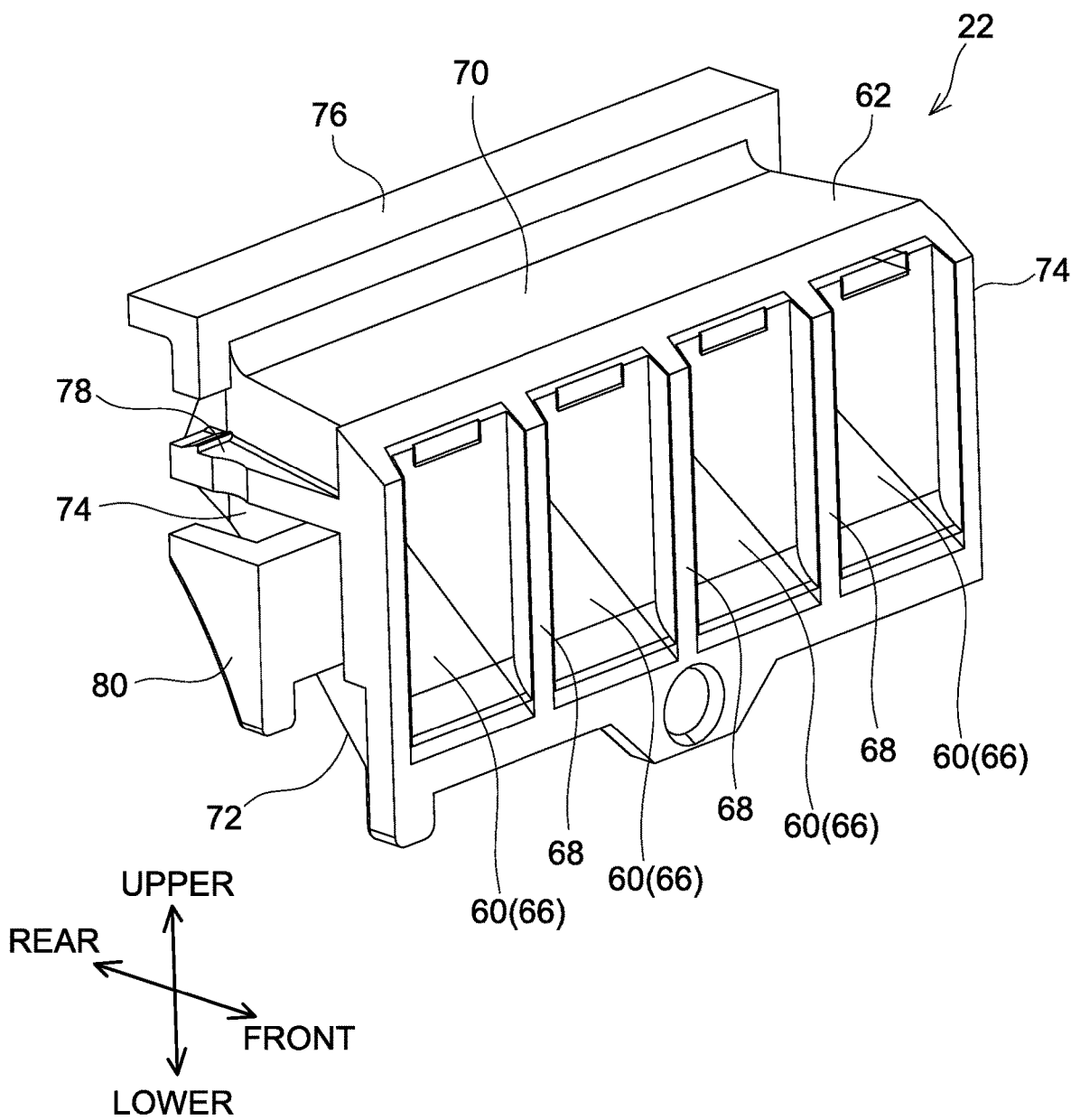
FIG. 5 is an upper-front perspective view of a light guiding member 22 of the embodiment.
Figure 6:
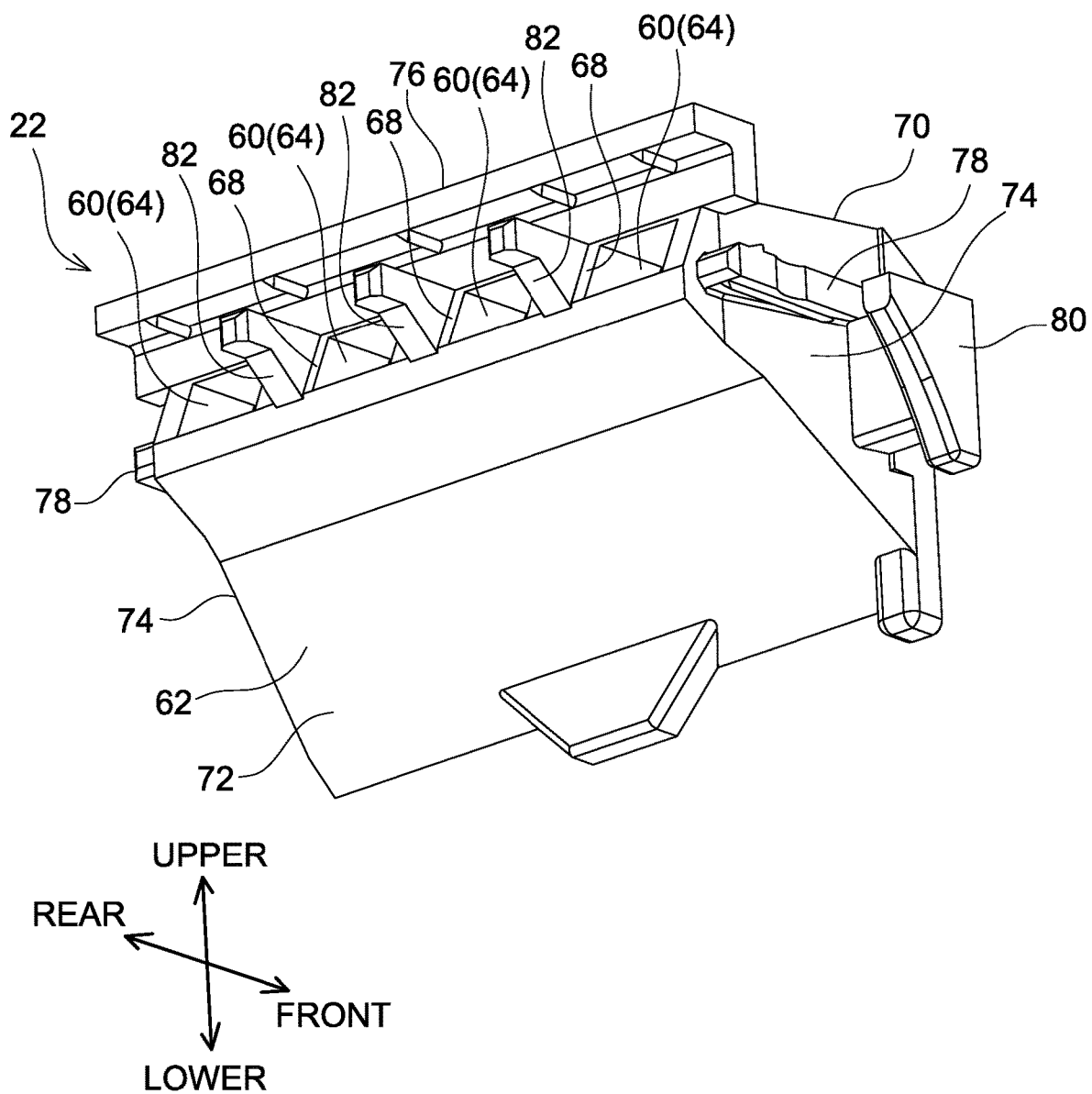
FIG. 6 is a lower-rear perspective view of the light guiding member 22 of the embodiment.
Figure 7:
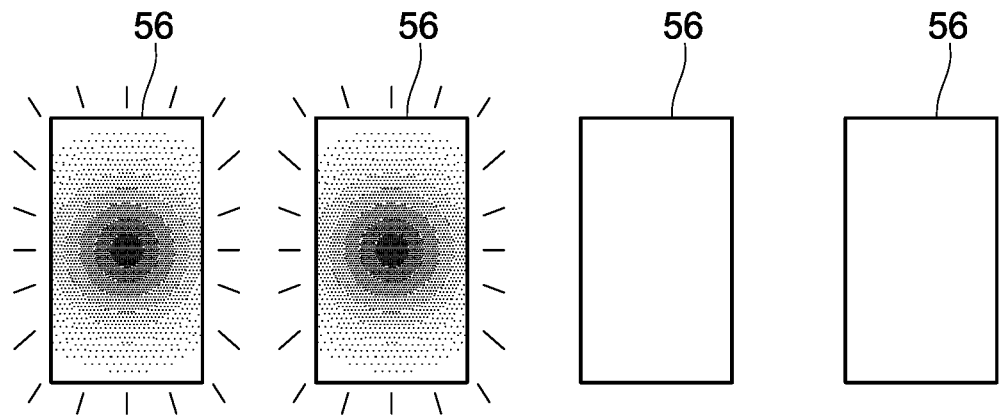
FIG. 7 is a diagram showing an example of display on display windows 56 of a comparative example.
Figure 8:
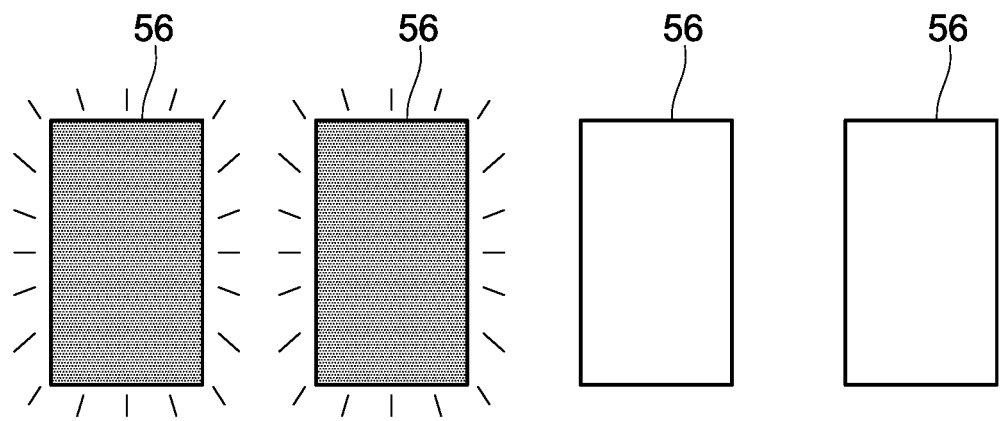
FIG. 8 is a diagram showing an example of display on display windows 56 of the embodiment.

As shown in FIGS. 5 and 6, the light guiding member 22 comprises light transmitting members 60 constituted of a material having a high optical transmittance, and a light shielding member 62 constituted of a material having a low optical transmittance. Each of the light transmitting members 60 comprises a light receiving surface 64 arranged to face corresponding one of the light emitting elements 58, and a light projecting surface 66 arranged to face corresponding one of the display windows 56 of the display portion 54. Light emitted from the light emitting element 58 enters inside of the light transmitting member 60 from the light receiving surface 64 and is projected to the display window 56 from the light projecting surface 66. If the battery pack 2 does not comprise the light guiding member 22 and light emitted from the light emitting element 58 is directly projected to the display window 56, the display window 56 corresponding to the light emitting element 58 which is emitting the light is lighted up such that brightness is high at its center and becomes gradually lower toward its periphery, as shown in FIG. 7. Contrary to this, when the battery pack 2 comprises the light guiding member 22 and light emitted from the light emitting element 58 is irradiated to the display window 56 via the light transmitting member 60 as in the present embodiment, the display window 56 corresponding to the light emitting element 58 which is emitting the light is lighted up such that brightness is uniform over its entirety, as shown in FIG. 8. According to the battery pack 2 of the present embodiment, visibility of the display portion 54 can be further improved.

As shown in FIGS. 5 and 6, the light shielding member 62 holds the light transmitting members 60 by surrounding each of the light transmitting members 60. The light shielding member 62 comprises partition walls 68 each of which is arranged to block adjacent light emitting members 60 from each other, an upper wall 70 arranged to cover upper portions of the plurality of light transmitting members 60, a lower wall 72 arranged to cover lower portions of the plurality of light transmitting members 60, and lateral walls 74 arranged to cover lateral portions of the light transmitting members 60 located on outermost sides in the right-and-left direction. An upper contact piece 76 which contacts the upper surface of the control substrate 18 at a front end portion of the control substrate 18 is provided on the rear side relative to the upper wall 70 of the light shielding member 62. A rib 78 formed along the front-and-rear direction is provided on each of the right and left lateral walls 74 of the light shielding member 62. Further, a lateral contact piece 80 which contacts a lateral surface of the cell case 16 at a front end portion of the cell case 16 is provided on one of the lateral walls 74 of the light shielding member 62. Further, extended walls 82 extending toward the rear side from the partition walls 68 are provided on the rear side relative to the partition walls 68 of the light shielding member 62.

In the battery pack 2 of the present embodiment, the light shielding member 62 comprises the partition walls 68 each of which is arranged to block adjacent light transmitting members 60 from each other, and thus light which enters a certain light transmitting member 60 from its corresponding light emitting element 58 can be prevented from leaking out to its adjacent light transmitting member 60.

The light guiding member 22 is formed by forming the light transmitting members 60 and the light shielding member 62 by double-molding. That is, when the light guiding member 22 is formed, firstly a mold for forming an outer shape of the light shielding member 62 only is prepared, and the light shielding member 62 is formed by molding. Then, a mold for forming an outer shape of the tight transmitting members 60 together with the light shielding member 62 is prepared, and the light transmitting members 60 are formed by molding. Thereby, the light transmitting members 60 and the light shielding member 62 can be integrally formed with no gap therebetween, without using an adhesive agent or the like.

Figure 9:
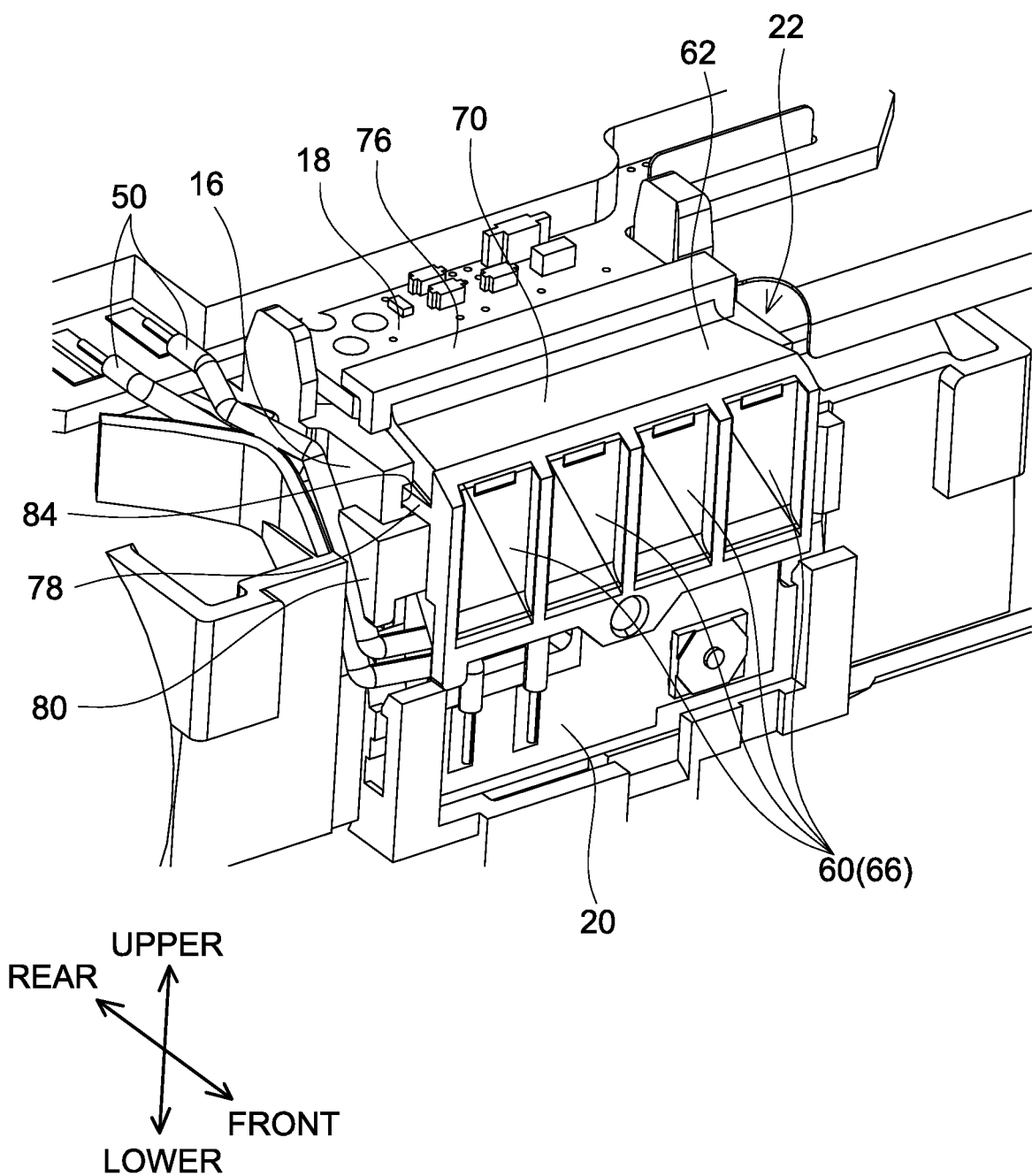
FIG. 9 is an upper-front perspective view of a state where the light guiding member 22 of the embodiment is attached to the battery module 6.
Figure 10:
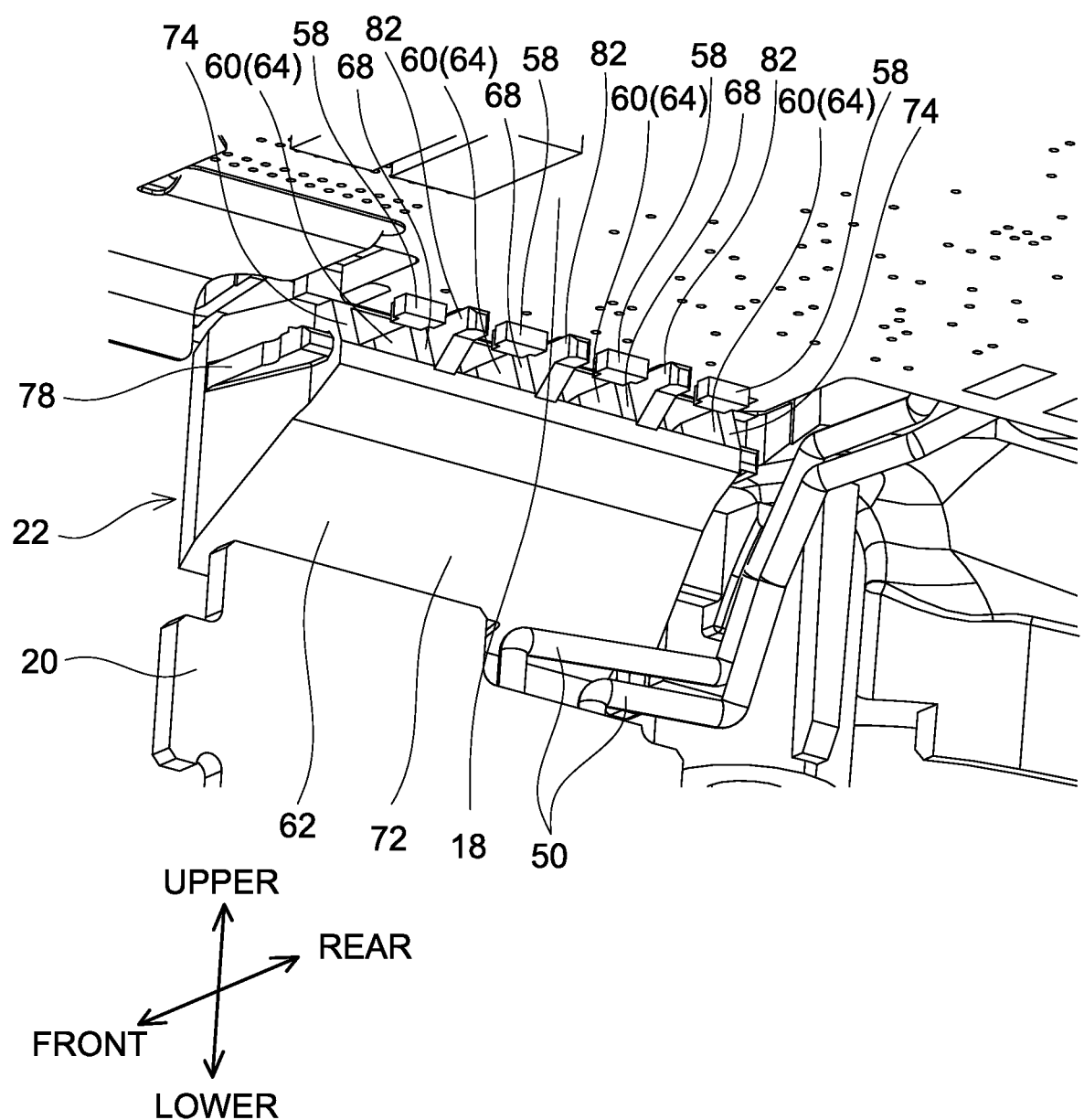
FIG. 10 is a lower-rear view of the state where the light guiding member 22 of the embodiment is attached to the battery module 6.

As shown in FIGS. 9 and 10, in a state where the light guiding member 22 is attached to the battery module 6, the ribs 78 on the lateral walls 74 of the light shielding member 62 are housed in guide grooves 84 which are provided in a front portion of the cell case 16 to correspond to the ribs 78, the upper contact piece 76 of the light shielding member 62 contacts the upper surface of the control substrate 18, the lateral contact piece 80 of the light shielding member 62 contacts the lateral surface of the cell case 16, and the extended walls 82 of the light shielding member 62 contact the lower surface of the control substrate 18. The light guiding member 22 engages the control substrate 18 with the control substrate 18 interposed between the upper contact piece 76 and the extended walls 82 from upper and lower sides, and thus misalignment between the light guiding member 22 and the control substrate 18 can be prevented. Further, the light guiding member 22 engages the cell case 16 by housing the ribs 78 in the guide grooves 84 and having the lateral contact piece 80 contact the lateral surface of the cell case 16, and thus the light guiding member 22 can be accurately positioned relative to the cell case 16 and misalignment between the light guiding member 22 and the cell case 16 can be prevented.

As shown in FIG. 10, in the state where the light guiding member 22 is attached to the battery module 6, each of the extended walls 82 is arranged on the lower surface of the control substrate 18 to block adjacent light emitting elements 58 from each other. According to such a configuration, light emitted from a certain light emitting element 58 can be prevented from being received by the light receiving surface 64 of the light transmitting member 60 corresponding to another light emitting element 58.

Figure 11:
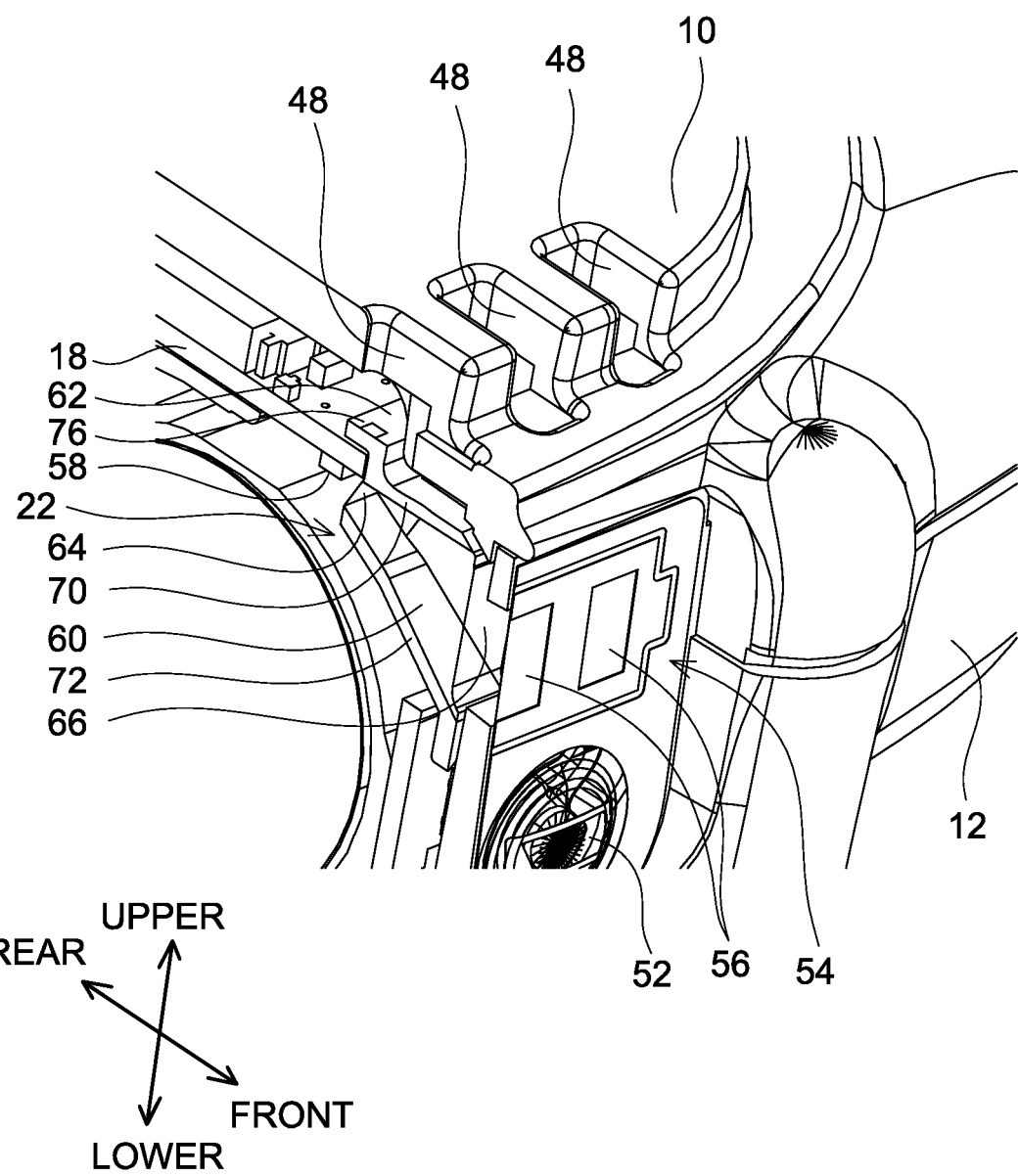
FIG. 11 is an upper-front cross-sectional perspective view of a state where the light guiding member 22 of the embodiment is attached to the battery pack 2.

As shown in FIG. 11, the upper wall 70 and the upper contact piece 76 of the light guiding member 22 are arranged to block the light emitting elements 58 of the control substrate 18 and the air exhaust openings 48 of the upper case 10 from each other. According to such a configuration, light emitted from the light emitting element 58 can be prevented from leaking to outside of the battery pack 2 through the air exhaust opening 48. Especially in the battery pack 2 of the present embodiment, since the air exhaust openings 48 are located between the light emitting elements 58 and the display windows 56 in a plan view of the battery pack 2, if the light guiding member 22 does not comprise the upper wall 70 and the upper contact piece 76, the light of the light emitting element 58 easily leaks out through the air exhaust opening 48. Light of the light emitting element 58 can be surely prevented from leaking out through the air exhaust opening 48 by the light guiding member 22 comprising the upper wall 70 and the upper contact piece 76.

In the battery pack 2 of the present embodiment, regarding the light emitting element 58 and the display window 56 corresponding to each other, the display window 56 is arranged to be tilted with respect to a straight line connecting a center of the light emitting element 58 and a center of the display window 56 such that an upper portion of the display window 56 is arranged at a position closer to the light emitting element 58 than a lower portion of the display window 56. If the light projecting surface 66 of the light transmitting member 60 is parallel to the light receiving surface 64, the display window 56 is lighted up such that brightness is high at the upper portion of the display window 56 and brightness is low at the lower portion of the display window 56. Contrary to this, in the battery pack 2 of the present embodiment, the light projecting surface 66 of the light transmitting member 60 is tilted with respect to the light receiving surface 64 according to the tilt of the display window 56, and thus the display window 56 can be lighted up with uniform brightness. Visibility of the display portion 54 can be further improved.

Figure 12:
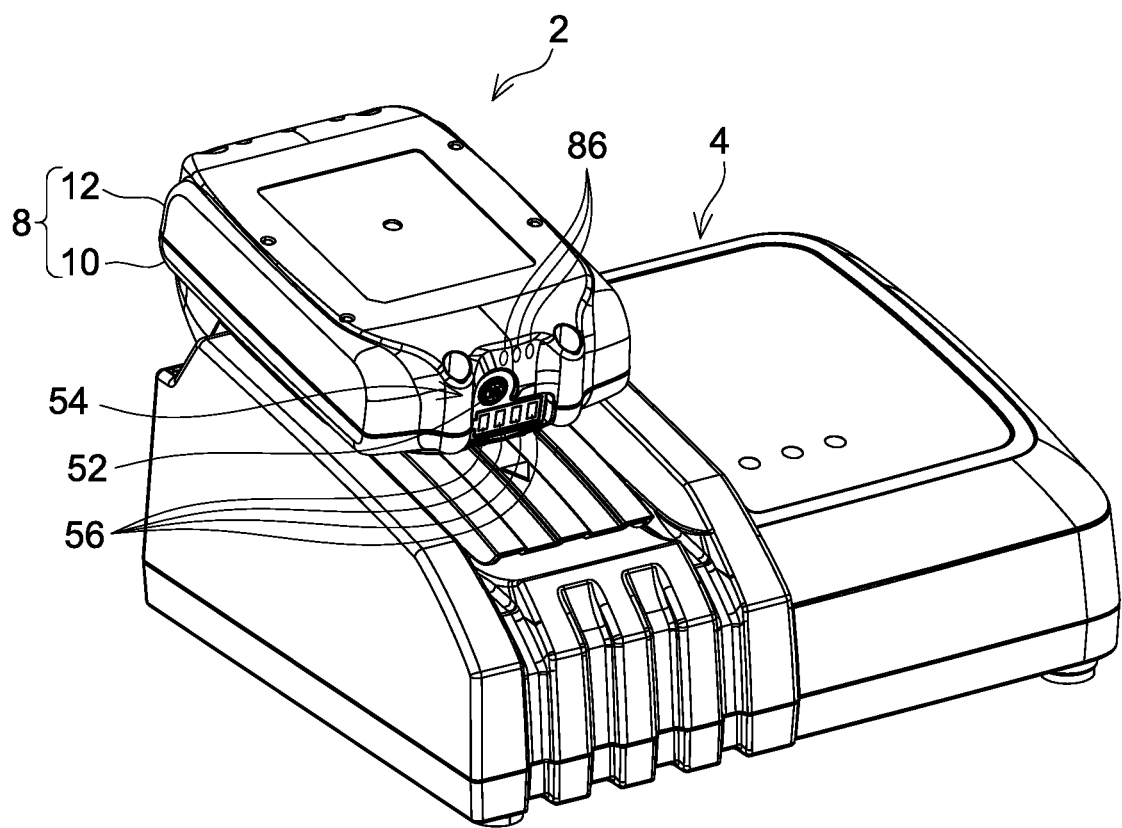
FIG. 12 is a perspective view of a state where a battery pack 2 of a variation is attached to a charger 4.

It should be noted that, as shown in FIG. 12, openings 86 which are visible from outside when the battery pack 2 is attached to the charger 4 or a power tool (not shown) may be provided in the lower case 12 of the outer case 8. In this case, by providing a lower extended wall (not shown) on the rear side relative to the lower wall 72 of the light guiding member 22 so as to block the light emitting elements 58 of the control substrate 18 and the openings 86 of the lower case 12 from each other, light emitted from the light emitting element 58 can be prevented from leaking to outside of the battery pack 2 through the opening 86.

In the aforementioned embodiment, the configuration where the battery module 6 comprises the plurality of battery cells 14 each of which is a cylindrical secondary battery cell is described as an example. However, the battery module 6 may comprise a laminated secondary battery cell.

In the aforementioned embodiment, it is described, as an example, that the light guiding member 22 is formed by double-molding of the light transmitting members 60 and the light shielding member 62. However, the light transmitting members 60 and the light shielding member 62 may be formed separately, and thereafter, the light guiding member 22 may be formed by combining the two.

In the aforementioned embodiment, it is described, as an example, that the openings are provided in the upper case 10 of the outer case 8 and that the openings are provided in the lower case 12 of the outer case 8. However, the outer case 8 may comprise a member in which an opening is provided, other than the upper case 10 and the lower case 12.

In the aforementioned embodiment, the configuration where the battery pack 2 can be detachably attached to a power tool and the battery pack 2 supplies power to the power tool is described as an example. However, the battery pack 2 may be detachably attached to other electrical device and the battery pack 2 may supply power to the electrical device.

Representative, non-limiting examples of the present invention have been described in detail with reference to the attached drawings. This detailed description is merely intended to teach a person of skill in the art further details for practicing preferred aspects of the present teachings and is not intended to limit the scope of the invention. Furthermore, each of the additional features and teachings which have been described may be utilized separately or in conjunction with other features and teachings to provide improved battery packs.

Moreover, combinations of features and steps disclosed in the above-described detailed description may not be necessary to practice the invention in the broadest sense, and are instead taught merely to particularly describe representative examples of the invention. Furthermore, various features of the above-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Specific examples of the present invention have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. A battery pack comprising:
    an outer case including a display portion and an opening portion, the display portion including one or more display windows;
    a battery cell housed in the outer case;
    a substrate housed in the outer case, the substrate having a first surface facing the opening portion and a second surface opposite the first surface;
    one or more light emitting elements corresponding to the one or more display windows mounted on the second surface of the substrate;
    a light guiding member housed in the outer case, the light guiding member including:
        one or more light transmitting members corresponding to the one or more light emitting elements and the one or more display windows, each of the one or more light transmitting members including a light receiving surface and a light projecting surface, the light receiving surface receiving light emitted from one of the one or more light emitting elements, and the light projecting surface projecting the light received on the light receiving surface onto one of the one or more display windows; and
    a light shielding member including:
        a partition wall arranged to block the light transmitting members, which are adjacent to each other, from each other; and
        an extended wall extending from the partition wall, the extended wall being arranged to block the light emitting elements, which are adjacent to each other, from each other; and
    a light shielding wall housed in the outer case, the light shielding wall being arranged to block the opening portion and the one or more light emitting elements from each other, a part of the light shielding member constituting the light shielding wall,
    wherein the light shielding wall contacts the first surface of the substrate and the extended wall contacts the second surface of the substrate so that the light guiding member engages an end portion of the substrate.

2. The battery pack according to claim 1, wherein the opening portion is provided in a surface of the outer case facing a charger, a power tool or an electronic device, when the battery pack is attached to the charger, the power tool or the electronic device.

3. The battery pack according to claim 1, wherein the opening portion is provided at a position on the outer case visible from outside, when the battery pack is attached to a charger, a power tool or an electronic device.

4. The battery pack according to claim 1, wherein, when seen in a plan view of the battery pack, the opening portion is positioned between the one or more light emitting elements and the one or more display windows.

5. The battery pack according to claim 1, wherein the light shielding member is integrally formed with the one or more light transmitting members.

6. A battery pack comprising:
    an outer case including a display portion and an opening portion, the display portion including one or more display windows;
    a battery cell housed in the outer case;
    a substrate housed in the outer case,
    one or more light emitting elements corresponding to the one or more display windows mounted on the substrate;
    a light guiding member housed in the outer case, the light guiding member including:
        one or more light transmitting members corresponding to the one or more light emitting elements and the one or more display windows, each of the one or more light transmitting members including a light receiving surface and a light projecting surface, the light receiving surface receiving light emitted from one of the one or more light emitting elements, and the light projecting surface projecting the light received on the light receiving surface onto one of the one or more display windows; and
    a light shielding member provided with a rib;
    a light shielding wall housed in the outer case, the light shielding wall being arranged to block the opening portion and the one or more light emitting elements from each other, a part of the light shielding member constituting the light shielding wall, and a cell case housed in the outer case, the cell case supporting the battery cell, the substrate, and the light guiding member, the cell case being provided with a guide groove corresponding to the rib, wherein the rib is housed into the guide groove when the light guiding member is attached to the cell case.

7. The battery pack according to claim 6, wherein the opening portion is provided in a surface of the outer case facing a charger, a power tool or an electronic device, when the battery pack is attached to the charger, the power tool or the electronic device.

8. The battery pack according to claim 6, wherein the opening portion is provided at a position on the outer case visible from outside, when the battery pack is attached to a charger, a power tool or an electronic device.

9. The battery pack according to claim 6, wherein, when seen in a plan view of the battery pack, the opening portion is positioned between the one or more light emitting elements and the one or more display windows.

10. The battery pack according to claim 6, wherein the light shielding member is integrally formed with the one or more light transmitting members.

11. The battery pack according to claim 6, wherein the light shielding member includes a partition wall arranged to block the light transmitting members, which are adjacent to each other, from each other.

12. The battery pack according to claim 11, wherein
the light shielding member further includes an extended wall extending from the partition wall, and
the extended wall is arranged to block the light emitting elements, which are adjacent to each other, from each other.

13. A battery pack comprising:
an outer case including a display portion and an opening portion, the display portion including one or more display windows;
a battery cell housed in the outer case;
a substrate housed in the outer case;
one or more light emitting elements corresponding to the one or more display windows mounted on the substrate;
a light guiding member housed in the outer case, the light guiding member including:
one or more light transmitting members corresponding to the one or more light emitting elements and the one or more display windows, each of the one or more light transmitting members including a light receiving surface and a light projecting surface, the light receiving surface receiving light emitted from one of the one or more light emitting elements, and the light projecting surface projecting the light received on the light receiving surface onto one of the one or more display windows, the light projecting surface being tilted with respect to the light receiving surface in each of the one or more light transmitting members, and the light projecting surface being larger than the light receiving surface in each of the one or more light transmitting members; and
a light shielding member; and
a light shielding wall housed in the outer case, the light shielding wall being arranged to block the opening portion and the one or more light emitting elements from each other, a part of the light shielding member constituting the light shielding wall.

14. The battery pack according to claim 13, wherein the opening portion is provided in a surface of the outer case facing a charger, a power tool or an electronic device, when the battery pack is attached to the charger, the power tool or the electronic device.

15. The battery pack according to claim 13, wherein the opening portion is provided at a position on the outer case visible from outside, when the battery pack is attached to a charger, a power tool or an electronic device.

16. The battery pack according to claim 13, wherein, when seen in a plan view of the battery pack, the opening portion is positioned between the one or more light emitting elements and the one or more display windows.

17. The battery pack according to claim 13, wherein the light shielding member is integrally formed with the one or more light transmitting members.

18. The battery pack according to claim 13, wherein the light shielding member includes a partition wall arranged to block the light transmitting members, which are adjacent to each other, from each other.

19. The battery pack according to claim 18, wherein
the light shielding member further includes an extended wall extending from the partition wall, and
the extended wall is arranged to block the light emitting elements, which are adjacent to each other, from each other.

* * * * *